United States Patent [19]
Tyler

[11] 4,240,309
[45] Dec. 23, 1980

[54] RATCHET DEVICES

[76] Inventor: David Tyler, 6, Church Rd., Warsash, Southampton, England

[21] Appl. No.: 883,889

[22] Filed: Mar. 6, 1978

[30] Foreign Application Priority Data

Mar. 7, 1977 [GB] United Kingdom ................. 9428/77

[51] Int. Cl.[3] ......................... F16H 5/52; B66D 1/30; B25B 13/46

[52] U.S. Cl. ........................................ 254/369; 81/60; 254/344; 74/812

[58] Field of Search ....................... 81/60, 61; 145/70; 74/810, 812; 242/47.01, 54 R; 254/150 R

[56] References Cited

U.S. PATENT DOCUMENTS

| | | | |
|---|---|---|---|
| 1,733,355 | 10/1929 | Morse | 81/60 X |
| 3,145,974 | 8/1964 | Short | 254/150 R |
| 3,587,364 | 6/1971 | Peyre | 81/60 X |
| 3,599,937 | 8/1971 | Carter | 254/150 R |
| 3,618,896 | 11/1971 | Bewley | 254/150 R |
| 3,711,065 | 1/1973 | Lawrence | 74/812 |
| 3,712,155 | 1/1973 | Stommel et al. | 74/810 |
| 3,728,914 | 4/1973 | Guangorena et al. | 74/812 |
| 3,802,665 | 4/1974 | Fawcett | 74/812 |
| 3,809,368 | 5/1974 | Lawrence | 74/812 X |
| 3,927,580 | 12/1975 | Fawcett | 74/812 |
| 3,962,935 | 6/1976 | Hutton et al. | 74/812 |
| 3,973,755 | 8/1976 | Fawcett | 74/812 X |
| 3,981,208 | 9/1976 | Moses | 74/812 |

FOREIGN PATENT DOCUMENTS

| | | | |
|---|---|---|---|
| 1218907 | 5/1960 | France | 81/60 |
| 1371340 | 7/1964 | France | 81/60 |
| 521055 | 3/1955 | Italy | 254/150 R |
| 662469 | 12/1951 | United Kingdom | 74/812 |

*Primary Examiner*—Leslie Braun
*Attorney, Agent, or Firm*—Hauke and Patalidis

[57] ABSTRACT

A ratchet device which comprises a rotatable driving member, a rotatable driven member, first and second ratchet means through which the driving member rotates the driven member when the driving member is rotated in respective first and second directions, and means which automatically permits to-and-fro movement of the driving member to enable the driven member to be turned in one direction by alternate strokes of said driving member.

10 Claims, 4 Drawing Figures

RATCHET DEVICES

BACKGROUND OF THE INVENTION

The invention relates to improvements in or relating to ratchet devices and is particularly, but not exclusively, concerned with a two-speed ratchet winch suitable for use in a boat.

Two-speed winches for boats are known which include a drum rotatably mounted on a normally fixed member. The drum is normally rotated by a removable handle so that rotation of the handle in one direction will rotate the drum through a ratchet in that direction, and rotation of the handle in the opposite direction will continue to rotate the drum in the first direction through reduction gearing in the winch. In this manner, the drum can be rotated in the first direction so as to wind in a rope until the torque required to turn the drum becomes too high. The direction of rotation of the handle can then be reversed to enable winding to be continued through the reduction gearing so that a greater mechanical advantage can be obtained.

One of the problems in operating such winches is that the operator can only drive the drum through the reduction gearing by rotating the handle in a full circular motion. Frequently the load on the winch makes it difficult to turn the handle through a full circle, particularly where the handle is in a difficult position relatively to the user. In order to overcome this problem, handles incorporating ratchets have been proposed so that the handle can be moved to-and-fro when winding the winch in low gear, alternate strokes of the handle imparting movement to the drum. However, such handles are heavy, cumbersome, expensive and require a device which must be manipulated to make the ratchet operate in the correct sense. An object of the invention is to provide an improved form of ratchet device.

SUMMARY OF THE INVENTION

According to one aspect of the invention, a ratchet device comprises a rotatable driving member, a rotatable driven member, first and second ratchet means through which the driving member rotates the driven member when the driving member is rotated in respective first and second directions, and means which automatically permits to-and-fro movement of the driving member to enable the driven member to be turned in one direction by alternate strokes of said driving member.

With such a device it is unnecessary to manipulate the ratchet means to permit the to-and-fro movement of the driving member. This can be advantageous particularly where the device is being operated one-handed.

Preferably the first and second ratchet means includes first and second ratchet members and pawls, and said means which automatically permits said to-and-fro movement comprises a pair of spaced apart abutments on one of said ratchet members engageable with abutment surfaces on said driving member, said driving member being rotatable realtively to said one ratchet member by an amount determined by the spacing of said abutments.

In one embodiment of ratchet device, the ratchet means may be mounted in a housing which constitutes said driving member, said driven member comprising a torque applying member rotatably supported by the housing. In such a case, the housing may conveniently take the form of a spanner head which can be used for applying torque to rotatable members, for example a two-speed winch as described hereinbefore.

According to another aspect of the invention there is provided a winch which includes a drum rotatable on a normally fixed member, a driving member extending into the drum, and first and second ratchet means through which the driving member rotates the drum, the drum being rotatable in the first direction through the first ratchet means by turning the driving member in said first direction, and also being rotatable in said first direction through the second ratchet means by turning the driving member in the opposite direction, means being provided which automatically permits to-and-fro movement of the driving member to enable the drum to be rotated through said second ratchet means by alternate strokes of said driving member.

Preferably the ratchet means includes a first ratchet member and pawl which drivably connects the driving member to the drum when the driving member is turned in said first direction, and a second ratchet member and pawl which drivably connects the driving member to the drum when the driving member is turned in said second direction, a drive transmission being provided through which drive is transmitted from the second ratchet member and pawl to the drum at a ratio other than 1:1. In such a case, and where the drive transmission provides a reduction drive, increased mechanical advantage can be obtained with the added advantage of to-and-fro movement of the handle normally used to turn the driving member.

The means which automatically permits said to-and-fro movement may conveniently comprise a pair of spaced apart abutments on the first said ratchet member engageable with abutment surfaces on said driving member, said driving member being rotatable relatively to said first ratchet member by an amount dertermined by the spacing of said abutments. In such a case, the abutment surfaces may comprise two diametrically opposed radial projections on said driving member, and the spaced apart abutments may comprise two diametrically opposed projections on the first ratchet member the driving member, the first ratchet member being coaxial with the drum.

A third ratchet member and pawl may be provided to prevent rotation of the drum in said opposite direction during to-and-fro movement of the driving member. In such a case the pawl associated with the first ratchet member may be carried by the drum, and the pawls associated with the second and third ratchet members may be carried by a toothed drive input gear of said drive transmission. Preferably, the third ratchet member is fast with said normally fixed member.

BRIEF DESCRIPTION OF THE DRAWINGS

A winch in accordance with the invention will now be described by way of example with reference to the accompanying drawings in which.

DETAILED DESCRIPTION OF THE PREFERRED EMBODIMENTS

Figure 1:
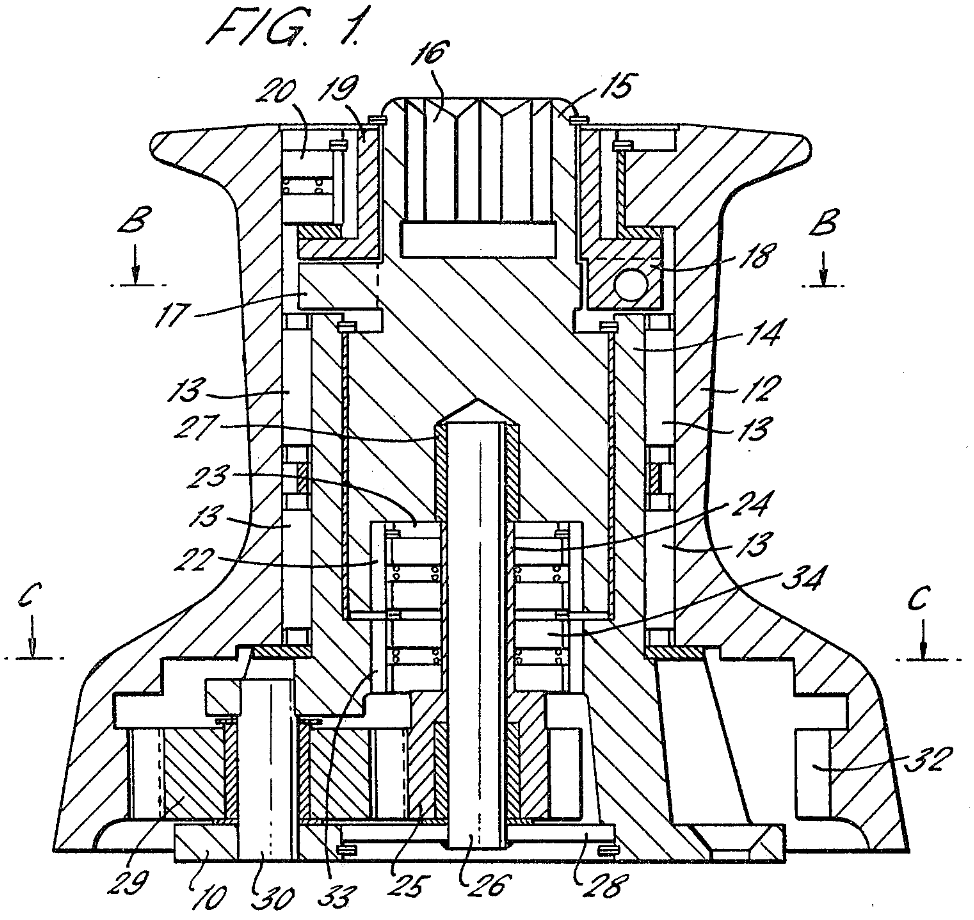
FIG. 1 is a vertical cross-section through a preferred form of winch on the line 1—1 in FIG. 3.
Figure 2:
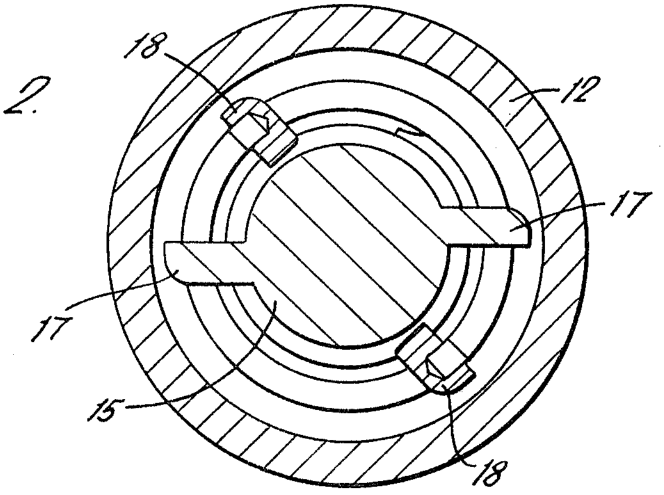
FIG. 2 is a cross-section of the winch shown in FIG. 1 on the line 2—2 in FIG. 1.

Referring to FIG. 1, the winch includes a base 10 which rotatably supports a drum 12 on bearings 13. A cylindrical extension 14 of the base 10 rotatably supports a drive shaft 15 which is formed at its upper end with a star-shaped socket 16. As shown clearly in FIG. 2 the drive shaft 15 has two projections 17 which engage respective abutments 18 of a ratchet 19 rotatably mounted in the drum 12. The ratchet 19 co-operates with pawls 20 carried by the drum 12 and constitutes the aforesaid first ratchet member.

Clockwise rotation of the drive shaft 15 (as view in FIGS. 2 and 3) by means of a suitable handle (not shown) located in the socket 16 will cause the projections 17 to engage the abutments 18 and rotate the drum through pawls 20. Rotation of the drive shaft 15 counter-clockwise will cause the projections 17 to disengage the abutments 18 and the drive shaft 15 will rotate for about 135° before engaging the opposite sides of the abutments 18. Further counter-clockwise rotation of the drive shaft will then cause the ratchet 19 to override the pawls 20.

The lower end of the drive shaft 15 is formed with a coaxial counterbore having its wall formed as a ratchet 22 (constituting the aforesaid second ratchet member). The ratchet 22 co-operates with pawls 23 splined to a cylindrical extension 24 of a toothed gear-wheel 25. The gear-wheel 25 is rotatably mounted on a pin 26, the upper end of which locates in a bearing 27 in the drive shaft 15 and the lower end of which is welded to a plate 28 located in the base 10. Counter-clockwise movement of the drive shaft 15 will result in driving engagement between the ratchet 22 and the pawls 23 and will rotate the gear-wheel 25. Drive to the drum 12 is transmitted from the gear-wheel 25 through an idler gear 29 rotatably mounted on a pin 30 secured to the base 10. The idler gear 29 meshes with teeth 32 formed on the interior of the drum 12. In this manner, counter-clockwise rotation of the gear-wheel 25 will result in clockwise rotation of the drum 12. Clockwise rotation of the drive shaft 15 will rotate the drum 12 in a 1:1 ratio. However, counter-clockwise rotation of the drive shaft 15 will rotate the drum at a lower rate through the gearing 25, 29 and 32 to provide a greater mechanical advantage.

Figure 3:
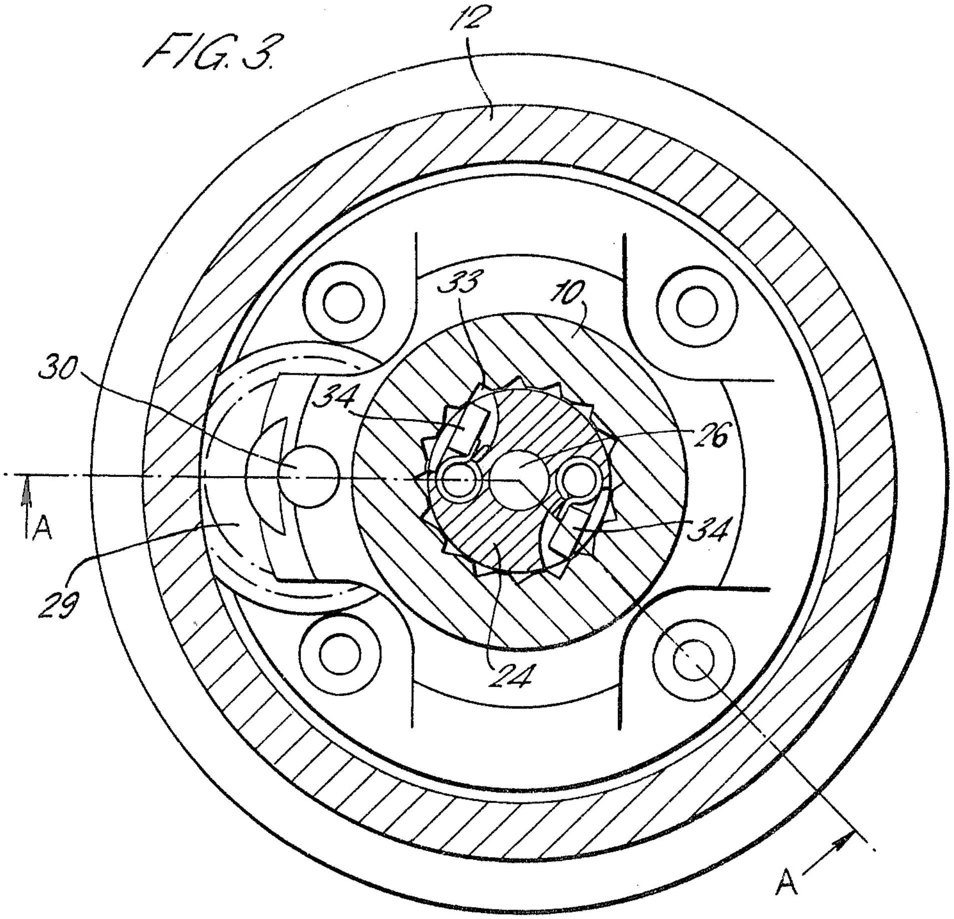
FIG. 3 is a cross-section of the winch shown in FIG. 1 on the line 3—3 in FIG. 1.

Rotation of the drum 12 in an counter-clockwise sense is inhibited by a ratchet 33 formed on the base 10 which co-operates with further pawls 34 splined to the extension 24 of the gear-wheel 25 as shown in FIG. 3. Ratchet 33 constitutes the aforesaid third ratchet member.

The winch is used as follows:

A rope, which may have one end secured to a sail of a boat, has its opposite end wound several times loosely around the drum 12. An operator then pulls the free end of the rope so that the drum 12 rotates clockwise and tension is created in the rope. Clockwise rotation of the drum causes all the ratchets to overrun. The operator continues to tighten the rope until the tension becomes too great for the operator to continue pulling. The operator then inserts the handle in the socket 16 and begins to wind the drive shaft 15 clockwise. Clockwise winding tensions the rope further until the tension becomes too great for further 1:1 ratio winding. The operator then winds the handle counter-clockwise so that winding can continue at a lower ratio. When winding in low ratio, the operator can take advantage of the 135° free movement of the drive shaft 15 in a clockwise sense. Thus, the handle can be turned counter-clockwise through a convenient arc to drive the drum incrementally, and can then be moved clockwise by up to 135° before being moved counter-clockwise again to transmit drive to the drum 12 once more. As the drive shaft is rotated clockwise, the ratchet 22 and pawls 23 overrun and counter-clockwise movement of the drum 12 is inhibited by the ratchet 33 and pawls 34. Clockwise movement of the handle for more than 135° is inhibited by the inter-engagement of the projections 17 and abutments of the handle located in the drive shaft has been facilitated by incorporating a ratchet in the handle itself. However, the winch in accordance with the invention enables a straightforward rigid handle to be used, such a handle being less expensive and considerably less heavy than ratchet-type handles. Furthermore, the operator is not faced with the problem of having to manipulate a ratchet on such a handle so that it can be operated in a desired rotational sense.

Figure 4:
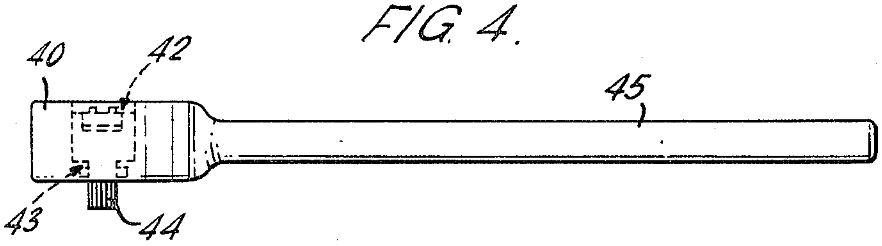
FIG. 4 is a schematic elevation of a spanner incorporating a ratchet device in accordance with the invention.

However, it is envisaged that the present invention may also be applied to a winch handle so that existing two-speed winches can be operated in the low ratio with a handle capable of to-and-fro movement. FIG. 4 shows schematically a housing 40 containing first and second ratchets 42, 43 and associated pawls (not shown) for driving a drive shank 44 clockwise or counter-clockwise. By arranging for the housing to drive one of the ratchets through projections and abutments as in the winch in FIGS. 1 to 3, a to-and-fro movement of the housing 40 will be possible when driving the drive shank in one direction. The drive shank 44 may be adapted to drive a known type of two-speed winch. A handle 45 is provided on the housing 40. An advantage of this arrangement is that it is possible to obtain the to-and-fro effect without having to manipulate a ratchet control on the housing 40.

What I claim as my invention and desire to secure by Letters Patent of the United States is:

1. A winch including a drum rotatable on a normally fixed member, a driving member extending into the drum, and first and second ratchet means through which the driving member rotates the drum, the drum being rotatable in a first direction through the first ratchet means by turning the driving member in said first direction, and also being rotatable in said first direction through the second ratchet means by turning the driving member in the opposite direction, drive coupling means being provided which permit to-and-fro movement of the driving member without manual manipulation of said drive coupling means to enable the driving member to turn the drum through said second ratchet means alternately driving said drum in said first direction and moving freely in said other direction without transmitting drive to the drum.

2. A winch, according to claim 1, in which the ratchet means includes a first ratchet member and pawl which drivably connects the driving member to the drum when the driving member is turned in said first direction, and a second ratchet member and pawl which drivably connects the driving member to the drum when the driving member is turned in said second direction, a drive transmission being provided through which drive is transmitted from the second ratchet member and pawl to the drum at a ratio other than 1:1.

3. A winch, according to claim 2, in which the ratchet means includes a third ratchet member and pawl which prevents rotation of the drum in said opposite direction during to-and-fro movement of the driving member.

4. A winch, according to claim 3, in which the pawl associated with said first ratchet member is carried by the drum, and the pawls associated with the second and third ratchet members are carried by a toothed drive input gear of said drive transmission.

5. A winch, according to claim 4, in which the third ratchet member is fast with said normally fixed member.

6. A winch, according to claim 5, in which said drive coupling means comprises a pair of spaced apart abutments on the first said ratchet member engageable with abutment surfaces on said driving member, said driving member being rotatable relatively to said first ratchet member by an amount determined by the spacing of said abutments, said spacing being greater than 90°.

7. A winch, according to claim 6, in which the abutment surfaces comprise two diametrically opposed radial projections on said driving member, and the spaced apart abutments comprise two diametrically opposed projections on the first ratchet member the driving member and the first ratchet member being coaxial with the drum.

8. A ratchet device comprising a rotatable driving member, a rotatable driven member, first and second ratchet means through which the driving member rotates the driven member in one direction when the driving member is rotated in respective first and second directions, and drive coupling means which permit to-and-fro movement of the driving member without manual manipulation of said drive coupling means to enable the driving member to turn the driven member through said second ratchet means alternately in said one direction and to move freely in the other direction without transmitting drive to the driven member.

9. A ratchet device according to claim 8, in which each of said first and second ratchet means includes first and second ratchet members and pawls, and said drive coupling means comprises a pair of spaced apart abutments on one of said ratchet members engageable with abutment surfaces on said driving member, said driving member being rotatable relative to said ratchet member by an amount determined by the spacing of said abutments, said spacing being greater than 90°.

10. A ratchet device according to claim 8 in which the ratchet means is mounted in a housing which constitutes said driving member, said driven member comprising a torque applying member rotatably supported by the housing.

* * * * *